US012626977B2

(12) United States Patent
Xu et al.

(10) Patent No.: US 12,626,977 B2
(45) Date of Patent: May 12, 2026

(54) TOP COVER ASSEMBLY FOR BATTERY AND BATTERY

(71) Applicant: Hithium Tech HK Limited, Kowloon (HK)

(72) Inventors: Weidong Xu, Xiamen (CN); Nan Zhang, Xiamen (CN); Yang Tang, Xiamen (CN); Ziqi Yi, Xiamen (CN); Zuyu Wu, Xiamen (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 863 days.

(21) Appl. No.: 17/956,204

(22) Filed: Sep. 29, 2022

(65) Prior Publication Data

US 2023/0117900 A1 Apr. 20, 2023

(30) Foreign Application Priority Data

Oct. 18, 2021 (CN) .......................... 202122508489.1

(51) Int. Cl.
*H01M 50/16* (2021.01)
*H01M 50/172* (2021.01)
(Continued)

(52) U.S. Cl.
CPC ......... *H01M 50/16* (2021.01); *H01M 50/172* (2021.01); *H01M 50/186* (2021.01);
(Continued)

(58) Field of Classification Search
CPC .. H01M 50/16; H01M 50/172; H01M 50/186; H01M 50/342; H01M 50/55;
(Continued)

(56) References Cited

U.S. PATENT DOCUMENTS

| | | | | |
|---|---|---|---|---|
| 2011/0104562 A1* | 5/2011 | Byun | ................... | H01M 50/176 429/181 |
| 2013/0004832 A1* | 1/2013 | Kim | .................... | H01M 50/176 429/179 |

(Continued)

FOREIGN PATENT DOCUMENTS

| | | |
|---|---|---|
| CN | 108428821 A | 8/2018 |
| CN | 110379953 A | 10/2019 |

(Continued)

OTHER PUBLICATIONS

English translation of CN-211265533-U (Year: 2020).*

(Continued)

*Primary Examiner* — Ula C Ruddock
*Assistant Examiner* — Sarika Gupta
(74) *Attorney, Agent, or Firm* — Scully, Scott, Murphy & Presser, P.C.

(57) ABSTRACT

The present disclosure discloses a top cover assembly of battery and top cover assembly, the top cover assembly comprising: a top cover having first recess on top surface, the first recess is provided around mounting hole; a terminal post penetrating mounting hole, first end of terminal post is limited to a side of top cover on which a bottom surface is located, second end of terminal post is higher than top surface of top cover; an upper plastic member provided on a side of top cover where top surface thereof is located and surrounding second end of terminal post to be connected to second end of the terminal post, the upper plastic member has a first boss on a bottom surface, the first boss is accommodated in the first recess, the bottom surface of the upper plastic member is connected to the top surface of the top cover.

18 Claims, 13 Drawing Sheets

100

(51) Int. Cl.

| | |
|---|---|
| *H01M 50/186* | (2021.01) |
| *H01M 50/342* | (2021.01) |
| *H01M 50/55* | (2021.01) |
| *H01M 50/627* | (2021.01) |

(52) U.S. Cl.
CPC ......... *H01M 50/342* (2021.01); *H01M 50/55* (2021.01); *H01M 50/627* (2021.01)

(58) Field of Classification Search
CPC ............. H01M 50/627; H01M 10/058; H01M 50/154; H01M 50/176; H01M 50/188; H01M 50/30; H01M 50/553; H01M 50/15; Y02E 60/10
See application file for complete search history.

(56) References Cited

U.S. PATENT DOCUMENTS

| | | | | |
|---|---|---|---|---|
| 2013/0011703 | A1* | 1/2013 | Kim ................... | H01M 50/538 |
| | | | | 429/61 |
| 2016/0268582 | A1* | 9/2016 | Lee ..................... | H01M 50/188 |
| 2019/0109302 | A1 | 4/2019 | Zheng et al. | |

FOREIGN PATENT DOCUMENTS

| | | | | |
|---|---|---|---|---|
| CN | 110854308 | A | | 2/2020 |
| CN | 210224083 | U | * | 3/2020 |
| CN | 110957438 | A | | 4/2020 |
| CN | 210272439 | U | | 4/2020 |
| CN | 211265533 | U | * | 8/2020 |
| CN | 212366065 | U | | 1/2021 |
| CN | 212967854 | U | | 4/2021 |
| CN | 214411343 | U | | 10/2021 |
| EP | 4167339 | A1 | | 4/2023 |
| ES | 2970819 | T3 | | 5/2024 |
| HU | E064673 | T2 | | 4/2024 |
| WO | 2020063584 | A1 | | 4/2020 |

OTHER PUBLICATIONS

English translation of CN-210224083-U (Year: 2020).*
Extended European Search report dated Mar. 2, 2023 received in European patent Application No. EP 22197277.1.
Notice of the first review opinion received in CN Application No. 202111210343.7 dated Apr. 27, 2023, 21 pages.
Notice of the second review opinion received in CN Application No. 202111210343.7 dated Oct. 14, 2023, 20 pages.
Notice of the third review opinion received in CN Application No. 202111210343.7 dated Dec. 25, 2023, 16 pages.
Notice of Granting Utility Model Patent Right received in CN Application No. 202122508489.1 dated Feb. 16, 2022, 2 pages.

* cited by examiner

100

400

200

100

400

300

200

A-A

3

311

3111

1

3

311

3112

1

131    11    13

1

D

C–C

TOP COVER ASSEMBLY FOR BATTERY AND BATTERY

FIELD

The present disclosure relates to the field of batteries, and in particular, to a top cover assembly for battery and a battery.

BACKGROUND

Batteries are used in a variety of applications as a device for storing electrical energy. For example, for streetlights powered by photovoltaic systems, batteries are usually needed to store the electricity generated by the photovoltaic system during the day for use at night, so the battery industry has been developed vigorously in recent years.

Usually, the battery includes a top cover assembly, and the top cover assembly includes an upper plastic member and a top cover, and the upper plastic member is disposed on the top surface of the top cover. However, after setting the upper plastic member on the top surface of the top cover, there is often a situation that the connection between the upper plastic member and the top cover is not secure, and there is also a situation that the upper plastic member moves relative to the top cover in the direction parallel to the top surface of the top cover. For this reason, it is necessary to provide a novel top cover assembly and battery to solve the above problem.

SUMMARY

The present disclosure discloses a top cover assembly for a battery and a battery, which is capable of avoiding the movement of the upper plastic member relative to the top cover in a direction parallel to the top surface of the top cover.

To achieve the above objective, in a first aspect, the present disclosure discloses a top cover assembly for a battery, the battery comprising a housing having an opening and a jelly-roll disposed within the housing, the top cover assembly for closing the opening, wherein the top cover assembly comprises:

a top cover, the top cover having a mounting hole, the mounting hole extending through the top cover in a thickness direction of the top cover, the top cover having a first recess on a top surface thereof, the first recess being provided around the mounting hole;

a terminal post, the terminal post penetrating the mounting hole, a first end of the terminal post being limited to a side of the top cover on which a bottom surface thereof is located, a second end of the terminal post being higher than the top surface of the top cover;

an upper plastic member, the upper plastic member being provided on a side of the top cover on which the top surface is located and surrounding the second end of the terminal post to be connected to the second end of the terminal post, the upper plastic member having a first boss on a bottom surface thereof, the first boss being accommodated in the first recess, the bottom surface of the upper plastic member being connected to the top surface of top cover.

Since the terminal post penetrates the mounting hole of the top cover and the first end of the terminal post is limited to a side of the top cover on which the bottom surface thereof is located, the second end of the terminal post is higher than the top surface of the top cover, the upper plastic member is provided on a side of the top cover on which the top surface is located and surrounds the second end of the terminal post to be connected to the second end of the terminal post, and the bottom surface of the upper plastic member is in contact with the top surface of the top cover. Therefore, the top cover will be sandwiched between the upper plastic member and the first end of the terminal post, so that the purpose of assembling the top cover, the terminal post and the upper plastic member of the top cover assembly can be achieved.

Due to the fact that the top surface of the top cover is provided with a first recess, the bottom surface of the first recess and the top surface of the top cover form a first step structure, the bottom surface of the upper plastic member is provided with a first boss, and the first boss and the bottom surface of the upper plastic member jointly form a second step structure matched with the first step structure. Therefore, when the upper plastic member is provided on a side of the top cover on which the top surface is located, the first boss can be accommodated in the first recess, in this way, the first recess of the top cover can play the role of positioning the upper plastic member, so that the upper plastic member can be prevented from moving relative to the top cover in the direction parallel to the top surface of the top cover.

In addition, since the first boss on the upper plastic member is accommodated in the first recess on the top cover and the bottom surface of the upper plastic member is in contact with the top surface of the top cover, the first contact surface located between the top surface of the first boss and the bottom surface of the first recess and the second contact surface located between the bottom surface of the upper plastic member and the top surface of the top cover will not be coplanar, and in common parlance, the first contact surface and the second contact surface will be high and low. In this way, the connection relationship between the upper plastic member and the top cover is more secure.

In addition, by providing a first recess on the top surface of the top cover and a first boss on the bottom surface of the upper plastic member, and making the first boss accommodated in the first recess, it is possible to make the structure formed by the top cover and the upper plastic member together lighter and thinner in the direction perpendicular to the top surface of the top cover when the upper plastic member is provided on the top surface of the top cover, and thus to make the entire top cover assembly lighter and thinner.

Optionally, the top cover assembly further comprises a lower plastic member, the lower plastic member being provided on a side where the bottom surface of the top cover is located;

the top cover is provided with a second recess on the bottom surface thereof, the second recess is provided around the mounting hole, the lower plastic member is provided with a second boss matching the second recess at a position corresponding to the second recess, and the second boss is accommodated in the second recess.

When the top cover assembly further includes the lower plastic member, by providing a second recess on the bottom surface of the top cover, and providing a second boss matching the second recess at the position of the lower plastic member corresponding to the second recess, and making the second boss accommodate in the second recess, on the one hand, the second recess can play the role of positioning the lower plastic member, and thus can prevent the lower plastic member from moving relative to the top cover in the direction parallel to the bottom surface of the top cover; on the other hand, it can also make the structure formed by the top cover and the lower plastic member together is thinner and lighter in the direction perpendicular to the bottom surface of the top cover, which can make the whole top cover assembly thinner and lighter.

Optionally, the first recess is provided with a first convex ring, the first convex ring is provided around the mounting hole, a first concave ring is provided at a position of the first boss of the upper plastic member corresponding to the first convex ring, and the first convex ring is embedded in the first concave ring.

By providing the first convex ring on the first recess, the first convex ring can play a role in reinforcing the strength of the top cover at the position of the first recess, and thus can prevent the fracture of the top cover at the first recess. By providing a first concave ring on the first boss of the upper plastic member at a position corresponding to the first convex ring, and making the first convex ring embedded in the first concave ring, the connection between the upper plastic member and the top cover can be made more secure.

Optionally, the first convex ring is provided along an edge of the first recess, and the first convex ring protrudes from the top surface of the top cover.

By arranging the first convex ring along the edge of the first recess, the strength of the top cover at the first recess can be better enhanced, which in turn can better prevent the top cover from breaking at the first recess. By making the first convex ring protrude from the top surface of the top cover, when the first convex ring is embedded into the first concave ring, the embedded depth is deeper, and the connection relationship between the upper plastic member and the top cover is more secure.

Optionally, the first recess is provided with a second concave ring, the second concave ring is provided around the mounting hole, a second convex ring is provided at a position of the first boss of the upper plastic member corresponding to the second concave ring, and the second convex ring is embedded in the second concave ring.

By providing a second concave ring on the first recess of the top cover, the top cover can be made thinner and lighter, and by providing a second convex ring on the first boss of the upper plastic member, the strength of the upper plastic member can be strengthened, and thus the strength of the upper plastic member can be made higher. At the same time, by making the second convex ring embedded in the second concave ring, the connection relationship between the upper plastic member and the top cover is more secure.

Optionally, the first recess has a rectangular shape; and/or the second recess has a rectangular shape.

When the shape of the first recess is rectangular, it will be appreciated that the shape of the first boss on the upper plastic member accommodated in the first recess will also be rectangular, so that when the first boss on the upper plastic member is accommodated in the first recess, the rectangular first recess can not only prevent the upper plastic member from moving relative to the top cover in the direction parallel to the top surface of the top cover, but also prevent the upper plastic member from rotating relative to the top cover in the direction parallel to the top surface of the top cover, that is, the upper plastic member can be better positioned.

When the shape of the second recess is rectangular, since a second boss matching the second recess is provided at the position of the lower plastic member corresponding to the second recess, when the second boss on the lower plastic member is accommodated in the second recess, the rectangular second recess can not only prevent the lower plastic member from moving relative to the top cover in the direction parallel to the bottom surface of the top cover, but also prevent the lower plastic member from rotating relative to the top cover in the direction parallel to the bottom surface of the top cover, that is, the lower plastic member can be better positioned.

Optionally, an area of a projection of the first recess on the top surface of the top cover is smaller than an area of a projection of the second recess on the top surface of the top cover.

This allows the first recess with a smaller projection area to position the smaller upper plastic member, and the second recess with a larger projection area to position the lower plastic member, and the size of the first recess and the second recess are designed reasonable, and the material is fully utilized.

Optionally, a depth of the first recess is less than a depth of the second recess.

Since the upper plastic member is smaller and the lower plastic member is larger, by making the depth of the first recess for positioning the upper plastic member smaller than the depth of the second recess for positioning the lower plastic member, the first recess with a smaller depth can be used for positioning the smaller upper plastic member and the second recess with a larger depth can be used for positioning the lower plastic member, and the depth of the first recess and the depth of the second recess are reasonably designed.

Optionally, a volume of the first recess is the same as a volume of the second recess.

By making the volume of the first recess the same as the volume of the second recess, the positioning effect of the first recess on the upper plastic member and the positioning effect of the second recess on the lower plastic member can be substantially the same, so that the whole structural design of the first recess and the second recess is more reasonable.

Optionally, the top cover has two mounting holes, and the two mounting holes are located at two ends of the top cover and are symmetrically located with respect to a centerline of the top cover.

When the number of the mounting holes is two, the two mounting holes are located at two ends of the top cover and are symmetrically arranged with respect to the centerline of the top cover, so that the layout of the mounting holes on the top cover is more aesthetically pleasing. In addition, it will be appreciated that the number of the terminal posts is usually two, and the terminal posts need to be arranged in the mounting holes in a penetrating manner, so that the number of the mounting holes is two, which can provide convenience for the terminal posts to penetrate through the mounting holes.

Optionally, the top cover is further provided with a liquid injection hole extending through the top cover in the thickness direction of the top cover, and the liquid injection hole is positioned between the two mounting holes and is offset from the centerline of the top cover.

By providing a liquid injection hole in the top cover that extends through the top cover in the thickness direction of the top cover, when the top cover assembly is applied to the battery, the electrolyte can be injected into the housing of the battery through the liquid injection hole.

By providing the liquid injection hole between the two mounting holes, when the electrolyte is injected into the housing of the battery through the liquid injection hole, the electrolyte can reach the middle part of the housing as much as possible, so that the battery performance can be better. In addition, by making the liquid injection hole deviate from the centerline of the top cover, the middle position of the top cover can be left free, so that the area of the top cover occupied by the liquid injection hole can be reduced as much as possible and the positional layout of the liquid injection hole on the top cover is more reasonable.

Optionally, the top cover is further provided with an explosion-proof through hole extending through the top cover in the thickness direction of the top cover, and the explosion-proof through hole is located between the two mounting holes and located on the centerline of the top cover.

By providing an explosion-proof through hole in the top cover, if the top cover assembly is located at the opening of the housing of the battery, when the air pressure inside the housing rises rapidly for various reasons and there is a risk of explosion, the pressure can be released through the explosion-proof through hole, thus preventing the whole battery from exploding. By making the explosion-proof through hole located on the centerline of the top cover, the explosion-proof through hole can be located in the middle of the top cover, thereby achieving a better pressure relief effect.

Optionally, the sum of areas of the mounting hole, the liquid injection hole and the explosion-proof through hole is S1, and the total area of the top cover is S, $0<S1/S≤0.2$.

With the sum of areas of the mounting hole, the liquid injection hole and the explosion-proof through hole being S1 and the total area of the top cover 1 being S, by making $0<S1/S≤0.2$, on the one hand, S1/S will not be too small, so that the mounting hole, liquid injection hole and explosion-proof through hole can each perform their respective functions. On the other hand, S1/S will not be too large, which can ensure that the strength of the top cover 1 is not so weak that causes breakage of the top cover.

Optionally, an inner edge of the first recess and an inner edge of the second recess are both connected to a hole edge of the mounting hole.

By making the inner edge of the first recess and the inner edge of the second recess both connected to the hole edge of the mounting hole, the machining of the first recess and the second recess can be more convenient.

Optionally, the upper plastic member is connected to the second end of the terminal post by a snap-fit structure, the snap-fit structure comprising a snap slot and a snap protrusion that cooperate with each other, the snap slot is provided on one of the upper plastic member and the second end of the terminal post, and the snap protrusion is provided on the other of the second end of the terminal post and the upper plastic member.

When a snap slot is provided on the second end of the terminal post and a snap protrusion is provided on the upper plastic member, the purpose of connecting the upper plastic member to the second end of the terminal post can be achieved by embedding the snap protrusion in the snap slot.

Since the connection method of embedding the snap protrusion into the snap slot is very secure, the connection relationship between the upper plastic member and the terminal post can be more secure when the snap-fit structure includes a snap slot and a snap protrusion that cooperate with each other, and the snap protrusion is embedded into the snap slot.

Optionally, the snap-fit structure is located at least partially within the mounting hole.

By making at least part of the snap-fit structure located in the mounting hole, the inner wall surface of the mounting hole can limit the snap-fit structure in the radial direction of the mounting hole, and thus can avoid the occurrence of the snap protrusion slipping out of the snap slot, and further avoid the occurrence of the upper plastic member falling off from the terminal post.

Optionally, the top cover assembly further comprises a sealing member, the top cover, the upper plastic member, the terminal post and the lower plastic member jointly form an accommodating cavity for accommodating the sealing member, and the sealing member is disposed in the accommodating cavity.

By arranging the sealing member in the accommodating cavity jointly formed by the top cover, the upper plastic member, the terminal post and the lower plastic member, the purpose of closing the accommodating cavity can be achieved. In this way, the top cover assembly can better close the opening of the housing of the battery, which can prevent the electrolyte inside the housing from leaking through the accommodating cavity to the outside of the housing, thereby improving the performance of the battery.

Optionally, a portion of the sealing member is embedded between an inner wall surface of the mounting hole and an outer wall surface of the terminal post.

The sealing member can close the gap between the inner wall surface of the mounting hole and the outer wall surface of the terminal post, so that the leakage of the electrolyte to the outside of the housing through the gap between the inner wall surface of the mounting hole and the outer wall surface of the terminal post can be avoided.

Optionally, another portion of the sealing member is embedded between the second recess and the first end of the terminal post.

By embedding another portion of the sealing member between the second recess and the first end of the terminal post, the sealing member can close the gap between the second recess and the first end of the terminal post, thus avoiding electrolyte leakage to the outside of the housing through the gap between the second recess and the first end of the terminal post.

In a second aspect, the present disclosure discloses a battery comprising the top cover assembly according to any one of the first aspect.

Since the upper plastic member in the top cover assembly does not move relative to the top cover in the direction parallel to the top surface of the top cover, the connection relationship between the upper plastic member and the top cover may be more secure. Based on this, when the top cover assembly is applied in the battery, the battery can be made more durable.

Compared with the prior art, the present disclosure has the following beneficial effects.

Since the top surface of the top cover is provided with a first recess and the bottom surface of the upper plastic member is provided with a first boss, the first boss can be accommodated in the first recess when the upper plastic member is set to the side where the top surface of the top cover is located, so that the first recess of the top cover can serve to position the upper plastic member so that the upper plastic member can be prevented from moving relative to the top cover in the direction parallel to the top surface of the top cover.

In addition, since the first boss on the upper plastic member is accommodated in the first recess on the top cover and the bottom surface of the upper plastic member is in contact with the top surface of the top cover, the first contact surface located between the top surface of the first boss and the bottom surface of the first recess and the second contact surface located between the bottom surface of the upper plastic member and the top surface of the top cover will not be coplanar, and in common parlance, the first contact surface and the second contact surface will be high and low. In this way, the connection relationship between the upper plastic member and the top cover is more secure.

In addition, by providing a first recess on the top surface of the top cover and a first boss on the bottom surface of the upper plastic member, and making the first boss accommodated in the first recess, it is possible to make the structure formed by the top cover and the upper plastic member together lighter and thinner in the direction perpendicular to the top surface of the top cover when the upper plastic member is provided on the top surface of the top cover, and thus to make the entire top cover assembly lighter and thinner.

BRIEF DESCRIPTION OF THE DRAWINGS

To illustrate the technical solutions in the embodiments of the present disclosure more clearly, the drawings required in the embodiments will be briefly described below. It is apparent that the drawings in the following description are merely some of the embodiments of the present disclosure. For those of ordinary skill in the art, other drawings can be obtained according to these drawings without creative efforts.

REFERENCE NUMERALS

Figure 1:
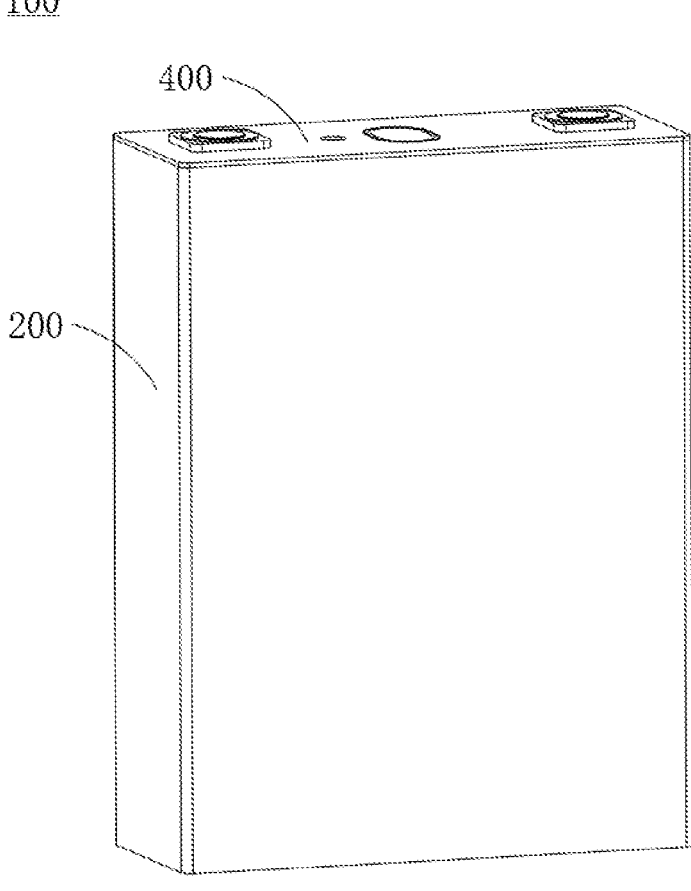
FIG. 1 is a schematic structural view of a battery according to an embodiment of the present disclosure.

1—top cover; 11—mounting hole; 12—top surface of top cover; 120—first step structure; 121—first recess;

1211—bottom surface of first recess; 1212—first convex ring; 1213—second concave ring; 13—bottom surface of top cover; 131—second recess; 14—liquid injection hole; 15—explosion-proof through hole;

2—terminal post;

3—upper plastic member; 31—bottom surface of upper plastic member; 310—second step structure; 311—first boss; 3111—first concave ring; 3112—second convex ring;

4—lower plastic member; 41—second boss;

5—snap-fit structure; 51—snap slot; 52—snap protrusion;

6—sealing member;

M—centerline; and

100—battery; 200—housing; 300—jelly-roll; 400—top cover assembly.

DETAILED DESCRIPTION OF EMBODIMENTS

The technical solutions in the embodiments of the present disclosure will be clearly and completely described below with reference to the drawings in the embodiments of the present disclosure. It is apparent that the described embodiments are merely a part of the embodiments of the present disclosure, rather than all of the embodiments. Based on the embodiments in the present disclosure, all other embodiments obtained by those of ordinary skill in the art without creative efforts shall fall within the protection scope of the present disclosure.

In the present disclosure, the terms "upper", "lower", "left", "right", "front", "rear", "top", "bottom", "inner", "outer", "middle", "vertical", "horizontal", "transverse", "longitudinal", etc. indicate the orientation or position relationship based on the orientation or positional relationship shown in the drawings. These terms are primarily used to better describe the present disclosure and the embodiments thereof, and are not intended to limit the fact that the indicated device, element, or component must have a particular orientation, or be constructed and operated in a particular orientation.

In addition, some of the above terms may be used to express other meanings besides orientation or positional relationship, for example, the term "on" may also be used to express a certain attachment or connection relationship in some cases. For those of ordinary skill in the art, the specific meanings of these terms in the present disclosure can be understood on a case-by-case basis.

In addition, the terms "installed", "arranged", "provided", "connected", "joined" should be construed broadly. For example, it may be a fixed connection, a detachable connection, or an integral structure; it may be a mechanical connection, or an electrical connection; it may be directly connected, or indirectly connected through an intermediate medium, or may be an internal connection between two devices, elements, or components. For those of ordinary skill in the art, the specific meanings of the above terms in the present disclosure may be understood on a case-by-case basis.

In addition, the terms "first", "second", etc. are mainly used to distinguish different devices, elements or components (which may or may not be of the same specific types and configurations), and are not used to indicate or imply the relative importance and number of the indicated devices, elements, or components. Unless otherwise stated, "a plurality of" means two or more.

The technical solutions of the present disclosure will be further described below with reference to specific embodiments and drawings.

Embodiment 1

Figure 2:
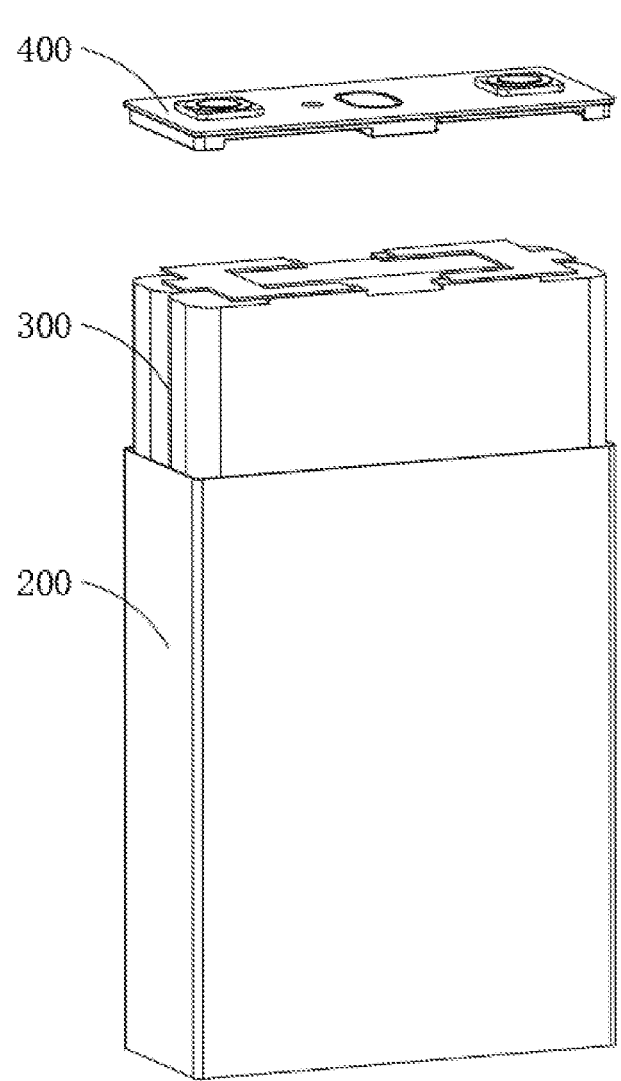
FIG. 2 is an exploded view of the battery in FIG. 1.
Figure 3:
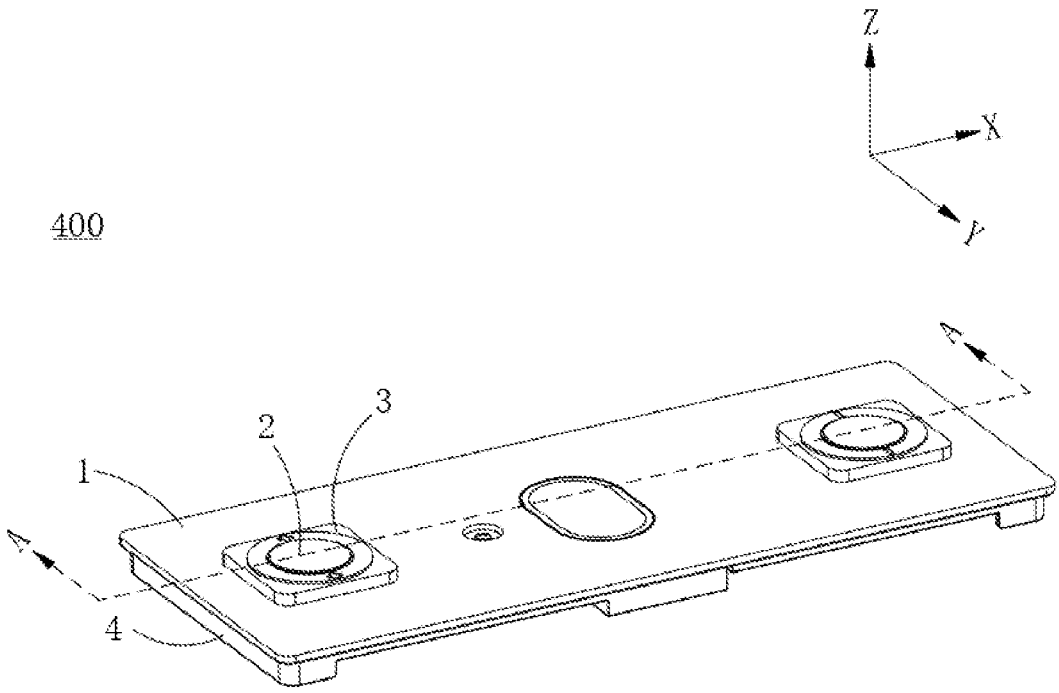
FIG. 3 is a schematic structural view of the top cover assembly of the battery in FIG. 1.
Figure 4:
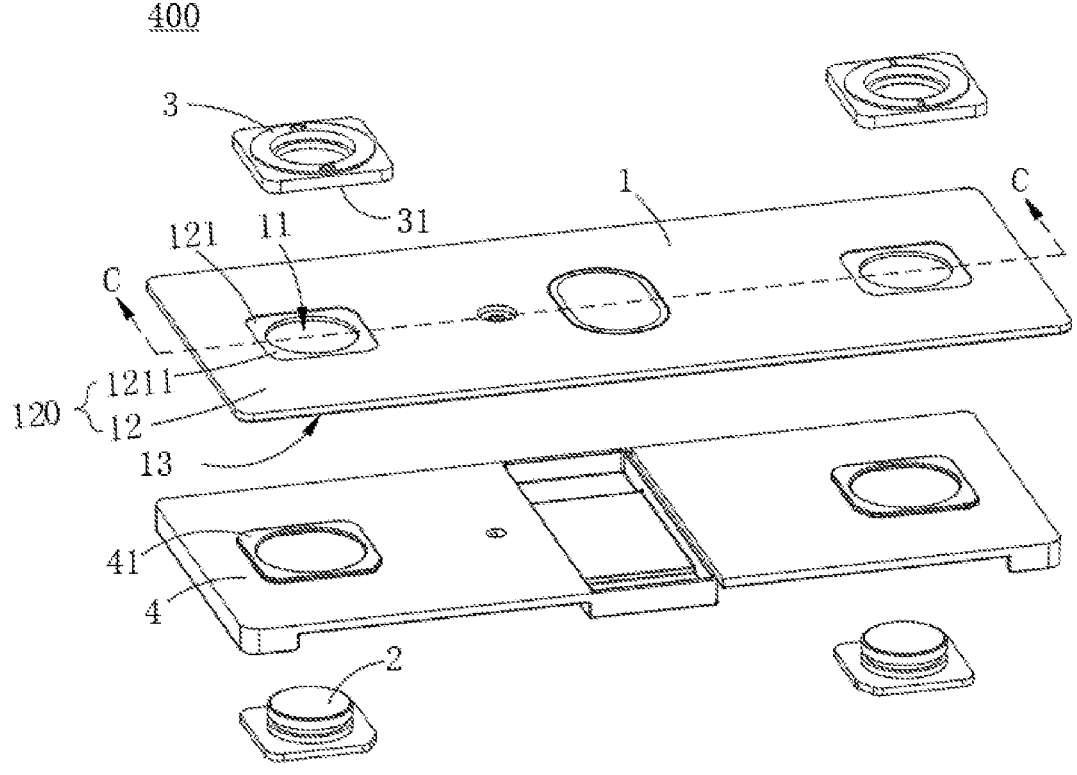
FIG. 4 is an exploded view of the top cover assembly in FIG. 3.

FIG. 1 is a schematic structural view of a battery according to an embodiment of the present disclosure, FIG. 2 is an exploded view of the battery in FIG. 1, FIG. 3 is a schematic structural view of the top cover assembly of the battery in FIG. 1, FIG. 4 is an exploded view of the top cover assembly in FIG. 3.

Figure 5:
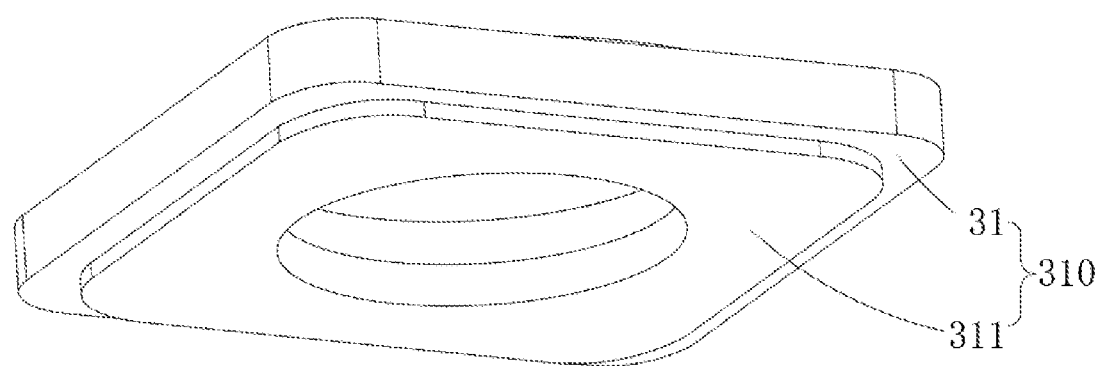
FIG. 5 is a schematic structural view of the first type of upper plastic member according to an embodiment of the present disclosure.

Referring to FIG. 1 and FIG. 2, the battery 100 includes a housing 200 having an opening and a jelly-roll 300 disposed within the housing 200, and the top cover assembly 400 is configured to close the opening. Referring to FIG. 3 and FIG. 4, the top cover assembly 400 includes: a top cover 1, a terminal post 2 and an upper plastic member 3. The top cover 1 has a mounting hole 11, the mounting hole 11 extends through the top cover 1 in the thickness direction of the top cover 1, the top cover 1 has a first recess 121 on the top surface 12 thereof, the first recess 121 is provided around the mounting hole 11, the terminal post 2 penetrates the mounting hole 11, the first end of the terminal post 2 is limited to a side of the top cover 1 on which the bottom surface 13 thereof is located, and the second end of the terminal post 2 is higher than the top surface 12 of the top cover 1 is located. The upper plastic member 3 is provided on a side of the top cover 1 where the top surface 12 thereof is located and surrounds the second end of the terminal post 2, so as to be connected to the second end of the terminal post 2. Referring to FIG. 5, the first boss 311 is accommodated in the first recess 121, and the bottom surface 31 of the upper plastic member 3 is connected to the top surface 12 of the top cover 1.

In the embodiment of the present disclosure, since the terminal post 2 penetrates the mounting hole 11 of the top cover 1 and the first end of the terminal post 2 is limited to a side of the top cover 1 on which the bottom surface 13 thereof is located, the second end of the terminal post 2 is higher than the top surface 12 of the top cover 1, the upper plastic member 3 is provided on a side of the top cover 1 where the top surface 12 thereof is located and surrounds the second end of the terminal post 2 to be connected to the second end of the terminal post 2, and the bottom surface 31 of the upper plastic member 3 is connected to the top surface 12 of the top cover 1. Therefore, the top cover 1 will be sandwiched between the upper plastic member 3 and the first end of the terminal post 2, so that the purpose of assembling the top cover 1, the terminal post 2 and the upper plastic member 3 of the top cover assembly 400 can be achieved.

Due to the fact that the top surface 12 of the top cover 1 is provided with a first recess 121, the bottom surface 31 of the upper plastic member 3 is provided with a first boss 311. Therefore, when the upper plastic member 3 is provided on a side of the top cover 1 where the top surface 12 thereof is located, the first boss 311 can be accommodated in the first recess 121, in this way, the first recess 121 of the top cover 1 can play the role of positioning the upper plastic member 3, so that the upper plastic member 3 can be prevented from moving relative to the top cover 1 in the direction parallel to the top surface 12 of the top cover 1.

In addition, since the first boss 311 on the upper plastic member 3 is accommodated in the first recess 121 on the top cover 1 and the bottom surface 31 of the upper plastic member 3 is in contact with the top surface 12 of the top cover 1, the first contact surface located between the top surface of the first boss 311 and the bottom surface 1211 of the first recess 121 and the second contact surface located between the bottom surface 31 of the upper plastic member 3 and the top surface 12 of the top cover 1 will not be coplanar, and in common parlance, the first contact surface and the second contact surface will be high and low. In this way, the connection relationship between the upper plastic member 3 and the top cover 1 is more secure.

In addition, by providing a first recess 121 on the top surface 12 of the top cover 1 and a first boss 311 on the bottom surface 31 of the upper plastic member 3, and making the first boss 311 accommodated in the first recess 121, it is possible to make the structure formed by the top cover 1 and the upper plastic member 3 together lighter and thinner in the direction perpendicular to the top surface 12 of the top cover 1 (i.e., the Z-axis direction in FIG. 3) when the upper plastic member 3 is provided on the top surface 12 of the top cover 1, and thus to make the entire top cover assembly 400 lighter and thinner.

Referring to FIG. 4 and FIG. 5, when the top surface 12 of the top cover 1 is provided with a first recess 121, the bottom surface 1211 of the first recess 121 and the top surface 12 of the top cover 1 jointly form a first step structure 120, and correspondingly, when the bottom surface 31 of the upper plastic member 3 is provided with a first boss 311, the first boss 311 and the bottom surface 31 of the upper plastic member 3 can jointly form a second step structure 310. It will be appreciated that the first step structure 120 and the second step structure 310 are matched.

In order to make the upper plastic member 3 more stably connected to the top cover 1, in some embodiments, the top surface 12 of the top cover 1 may also be provided with one or more recesses 121 around the first recess 121 that have different depths from the depth of the first recess 121 in the direction perpendicular to the top surface 12 of the top cover 1, so that the one or more recesses and the first recess 121 may jointly form a step structure with a plurality of steps. Correspondingly, the bottom surface 31 of the first boss 311 may be provided with one or more bosses around the first boss 311 that have different heights from the height of the first boss 311 in the direction perpendicular to the bottom surface 31 of the first boss 311, such that the one or more bosses and the first boss 311 may jointly form a step structure having a plurality of steps. The two above-mentioned step structures having a plurality of steps can be matched with each other, and it is apparent that the upper plastic member 3 can be connected to the top cover 1 more stably.

It should be noted that the upper plastic member 3 can be directly injection molded onto the top cover 1. When the upper plastic member 3 is directly injection molded onto the top cover 1, the upper plastic member 3 can be connected to the top cover 1 more stably, thereby better preventing the upper plastic member 3 from being detached from the top cover 1.

It should be noted that the shape of the mounting hole 11 can be round or rectangular, etc., which is not limited in the embodiment of the present disclosure.

Figure 6:
FIG. 6 is a cross-sectional view of the top cover assembly in FIG. 3 at position A-A (only the top cover and the lower plastic member are retained)
Figure 6:
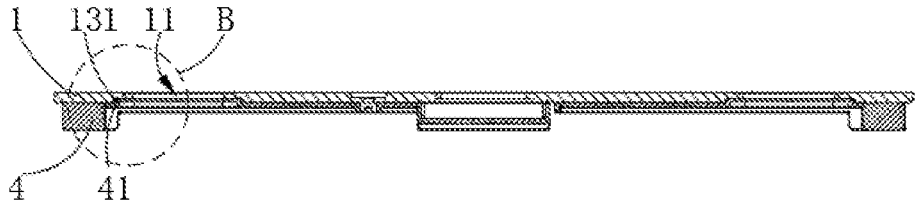
Figure 7:
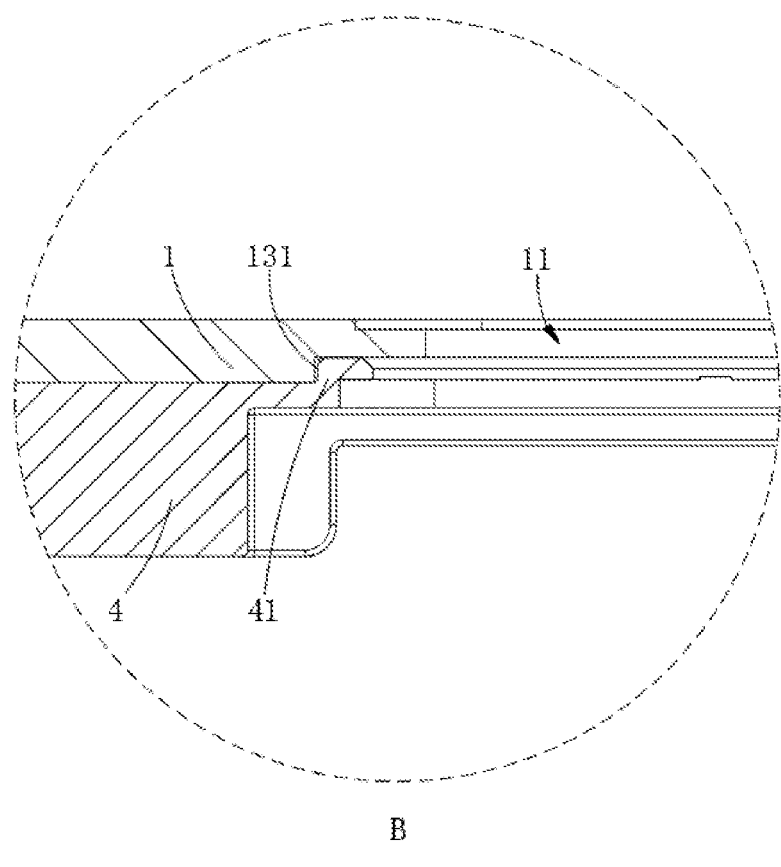
FIG. 7 is a partially enlarged view of the top cover assembly in FIG. 6 at position B (only the top cover and the lower plastic member are retained)

In some embodiments, referring to FIG. 3 and FIG. 4, the top cover assembly further includes a lower plastic member 4, which is provided on the side of the top cover 1 where the bottom surface 13 is located. Referring to FIG. 6 and FIG. 7, the bottom surface 13 of the top cover 1 is provided with a second recess 131, which is provided around the mounting hole 11, and the lower plastic member 4 is provided with a second boss 41 matching the second recess 131 at a position corresponding to the second recess 131. The second boss 41 is accommodated in the second recess 131.

When the top cover assembly further includes the lower plastic member 4, by providing a second recess 131 on the bottom surface 13 of the top cover 1, and providing a second boss 41 matching the second recess 131 at the position of the lower plastic member 4 corresponding to the second recess 131, and making the second boss 41 accommodate in the second recess 131, on the one hand, the second recess 131 can play the role of positioning the lower plastic member 4, and thus can prevent the lower plastic member 4 from moving relative to the top cover 1 in the direction parallel to the bottom surface 13 of the top cover 1; on the other hand, it can also make the structure formed by the top cover 1 and the lower plastic member 4 together is thinner and lighter in the direction perpendicular to the bottom surface 13 of the top cover 1 (i.e., the Z-axis direction in FIG. 6), which can make the whole top cover assembly 400 thinner and lighter.

Figure 8:
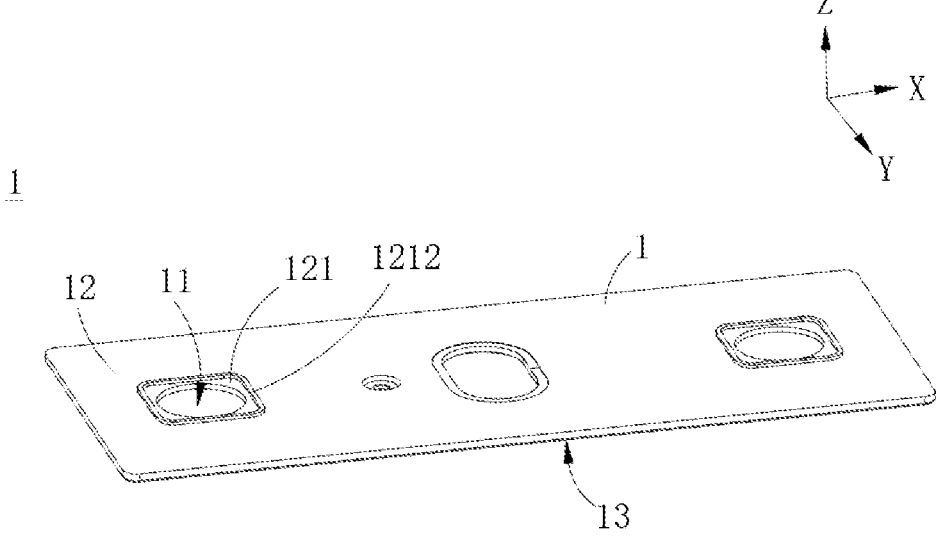
FIG. 8 is a schematic structural view of the first type of top cover according to an embodiment of the present disclosure.
Figure 9:
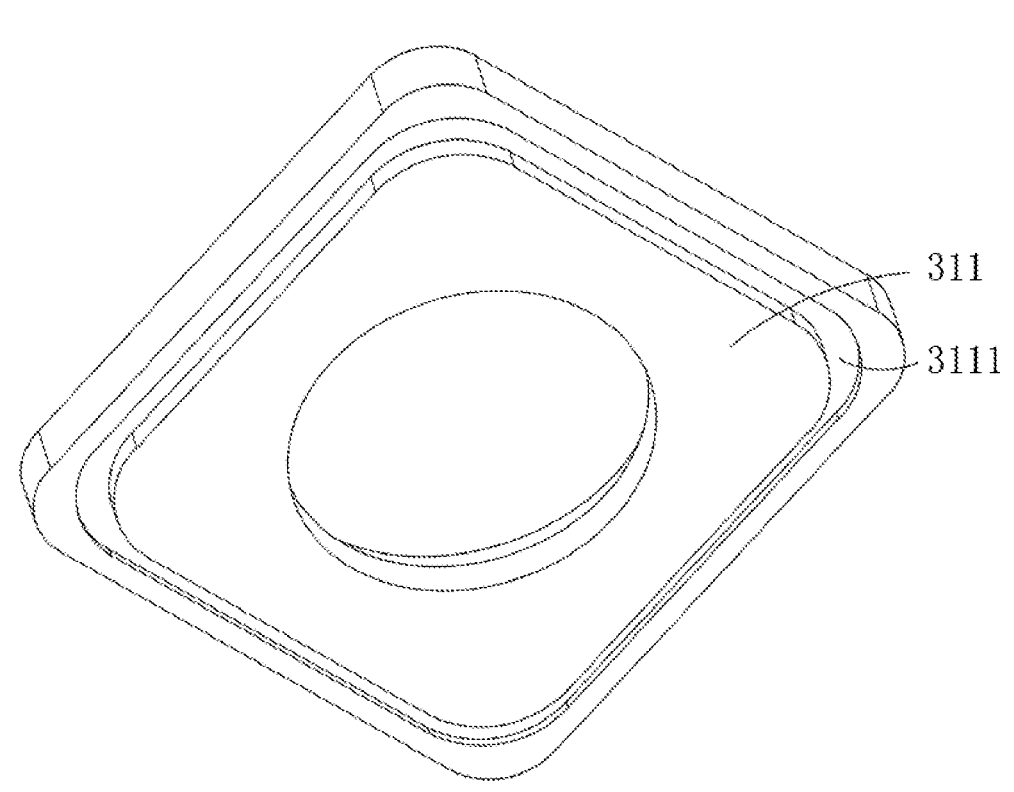
FIG. 9 is a schematic structural view of the second type of upper plastic member according to an embodiment of the present disclosure.

In some embodiments, referring to FIG. 8 and FIG. 9, the first recess 121 is provided with a first convex ring 1212, the first convex ring 1212 is provided around the mounting hole 11, the first convex ring 1212 of the upper plastic member 3 is provided with a first concave ring 3111 at a position corresponding to the first convex ring 1212, and the first convex ring 1212 is embedded in the first concave ring 3111.

By providing the first convex ring 1212 on the first recess 121, the first convex ring 1212 can play a role in reinforcing the strength of the top cover 1 at the position of the first recess 121, and thus can prevent the top cover 1 from breaking at the first recess 121. By providing a first concave ring 3111 on the first boss 311 of the upper plastic member 3 at a position corresponding to the first convex ring 1212, and making the first convex ring 1212 embedded in the first concave ring 3111, the connection between the upper plastic member 3 and the top cover 1 can be made more secure.

In some embodiments, referring to FIG. 8, the first convex ring 1212 is provided along the edge of the first recess 121 and the first convex ring 1212 protrudes from the top surface 12 of the top cover 1. Under normal circumstances, the edge of the first recess 121 is prone to stress concentration, which in turn makes the edge of the first recess 121 prone to fracture. Therefore, by providing the first convex ring 1212 along the edge of the first recess 121, the strength of the top cover 1 at the first recess 121 can be better strengthened, thereby better preventing the fracture of the top cover 1 at the first recess 121.

By making the first convex ring 1212 protrude from the top surface 12 of the top cover 1, when the first convex ring 1212 is embedded into the first concave ring 3111, the embedded depth is deeper, and the connection relationship between the upper plastic member 3 and the top cover 1 is more secure.

Figure 10:
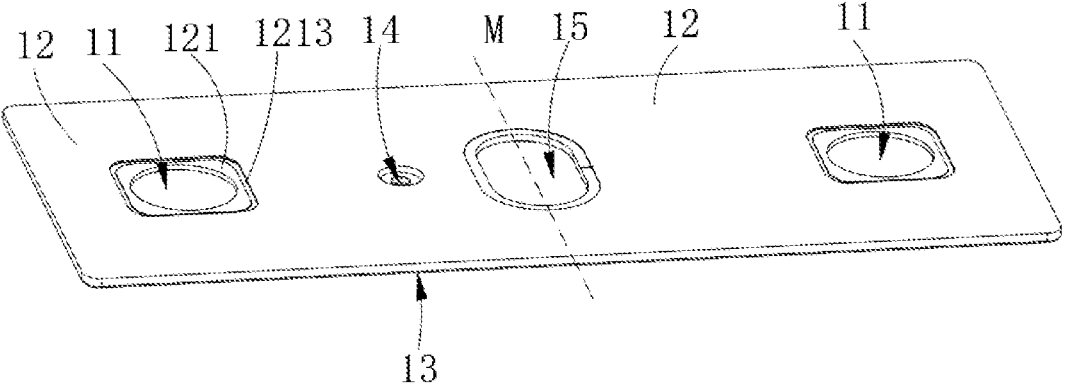
FIG. 10 is a schematic structural view of the second type of top cover according to an embodiment of the present disclosure.
Figure 11:
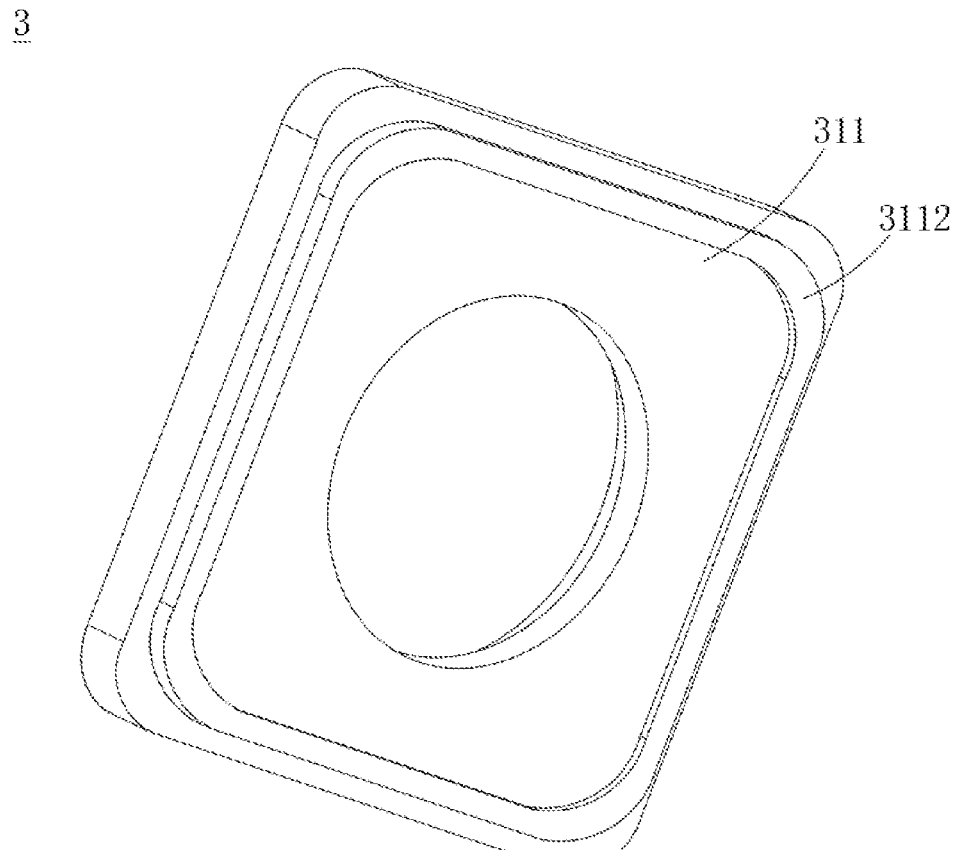
FIG. 11 is a schematic structural view of the third type of upper plastic member according to an embodiment of the present disclosure.

In some other embodiments, referring to FIG. 10 and FIG. 11, the first recess 121 is provided with a second concave ring 1213, the second concave ring 1213 is provided around the mounting hole 11, the first boss 311 of the upper plastic member 3 is provided with a second convex ring 3112 at a position corresponding to the second concave ring 1213, and the second convex ring 3112 is embedded in the second concave ring 1213.

In this embodiment, by providing a second concave ring 1213 on the first recess 121 of the top cover 1, the top cover 1 can be made thinner and lighter, and by providing a second convex ring 3112 on the first boss 311 of the upper plastic member 3, the strength of the upper plastic member 3 can be strengthened, and thus the strength of the upper plastic member 3 can be made higher. At the same time, by making the second convex ring 3112 embedded in the second concave ring 1213, the connection relationship between the upper plastic member 3 and the top cover 1 is more secure.

It should be noted that, referring to FIG. 10, the first recess 121 described above has a substantially rectangular shape. When the shape of the first recess 121 is rectangular, it will be appreciated that the shape of the first boss 311 on the upper plastic member 3 accommodated in the first recess 121 will also be rectangular, so that when the first boss 311 on the upper plastic member 3 is accommodated in the first recess 121, the rectangular first recess 121 can not only prevent the upper plastic member 3 from moving relative to the top cover 1 in the direction parallel to the top surface 12 of the top cover 1, but also prevent the upper plastic member 3 from rotating relative to the top cover 1 in the direction parallel to the top surface 12 of the top cover 1, that is, the upper plastic member 3 can be better positioned.

Figure 12:
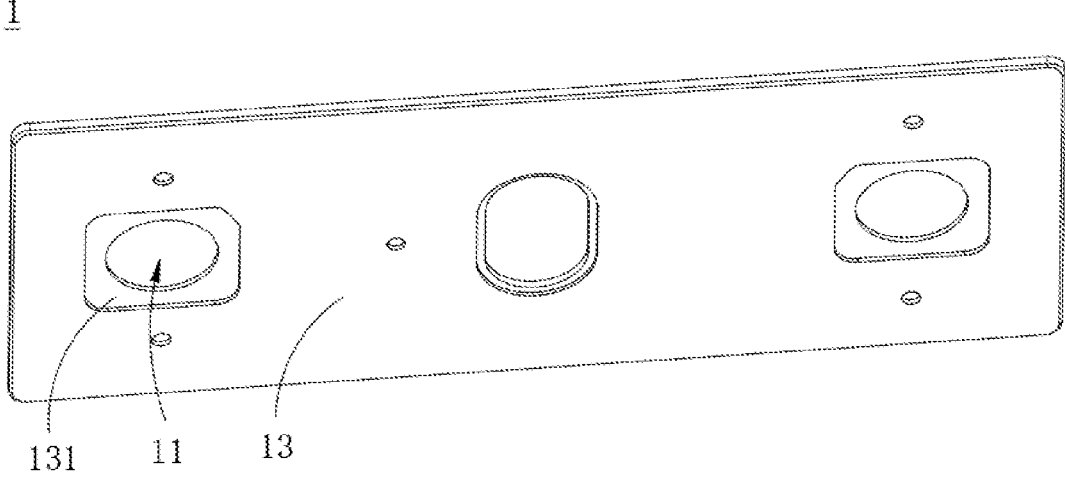
FIG. 12 is a schematic structural view of the third type of top cover according to an embodiment of the present disclosure.

In addition, referring to FIG. 4 and FIG. 12, the shape of the second recess 131 may also be rectangular. When the shape of the second recess 131 is rectangular, since a second boss 41 matching the second recess 131 is provided at the position of the lower plastic member 4 corresponding to the second recess 131, when the second boss 41 on the lower plastic member 4 is accommodated in the second recess 131, the rectangular second recess 131 can not only prevent the lower plastic member 4 from moving relative to the top cover 1 in the direction parallel to the bottom surface 13 of the top cover 1, but also prevent the lower plastic member 4 from rotating relative to the top cover 1 in the direction parallel to the bottom surface 13 of the top cover 1, that is, the lower plastic member 4 can be better positioned.

Certainly, the shape of the first recess 121 and the shape of the second recess 131 may also be other possible shapes, which is not limited in the embodiments of the present disclosure.

It will be appreciated that, under normal circumstances, the upper plastic member 3 is smaller than the lower plastic member 4, and since the first recess 121 is used for positioning the upper plastic member 3 and the second recess 131 is used for positioning the lower plastic member 4. Based on this, in some embodiments, referring to FIG. 10 and FIG. 12, the area of the projection of the first recess 121 on the top surface 12 of the top cover 1 is smaller than the area of the projection of the second recess 131 on the top surface 12 of the top cover 1. This allows the first recess 121 with a smaller projection area to position the smaller upper plastic member 3, and the second recess 131 with a larger projection area to position the lower plastic member 4, and the size of the first recess 121 and the second recess 131 are designed reasonable, and the material is fully utilized.

In addition, it will be appreciated that providing the first recess 121 will make the top cover 1 at the first recess 121 weaker and providing the second recess 131 will make the top cover 1 at the second recess 131 weaker, so that by making the area of the projection of the first recess 121 on the top surface 12 of the top cover 1 smaller than the area of the projection of the second recess 131 on the top surface 12 of the top cover 1, it is possible to make the projection of the first recess 121 on the top surface 12 of the top cover 1 and the projection of the second recess 131 on the top surface 12 of the top cover 1 will not be equal in size and completely overlapped, so that the situation in which the strength of the top cover 1 becomes substantially weaker can be avoided.

Figure 13:
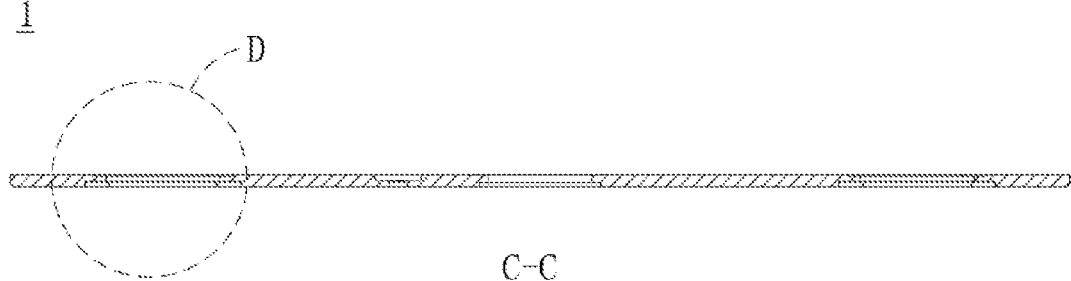
FIG. 13 is a cross-sectional view of the top cover in the top cover assembly of FIG. 4 at position C-C.
Figure 14:
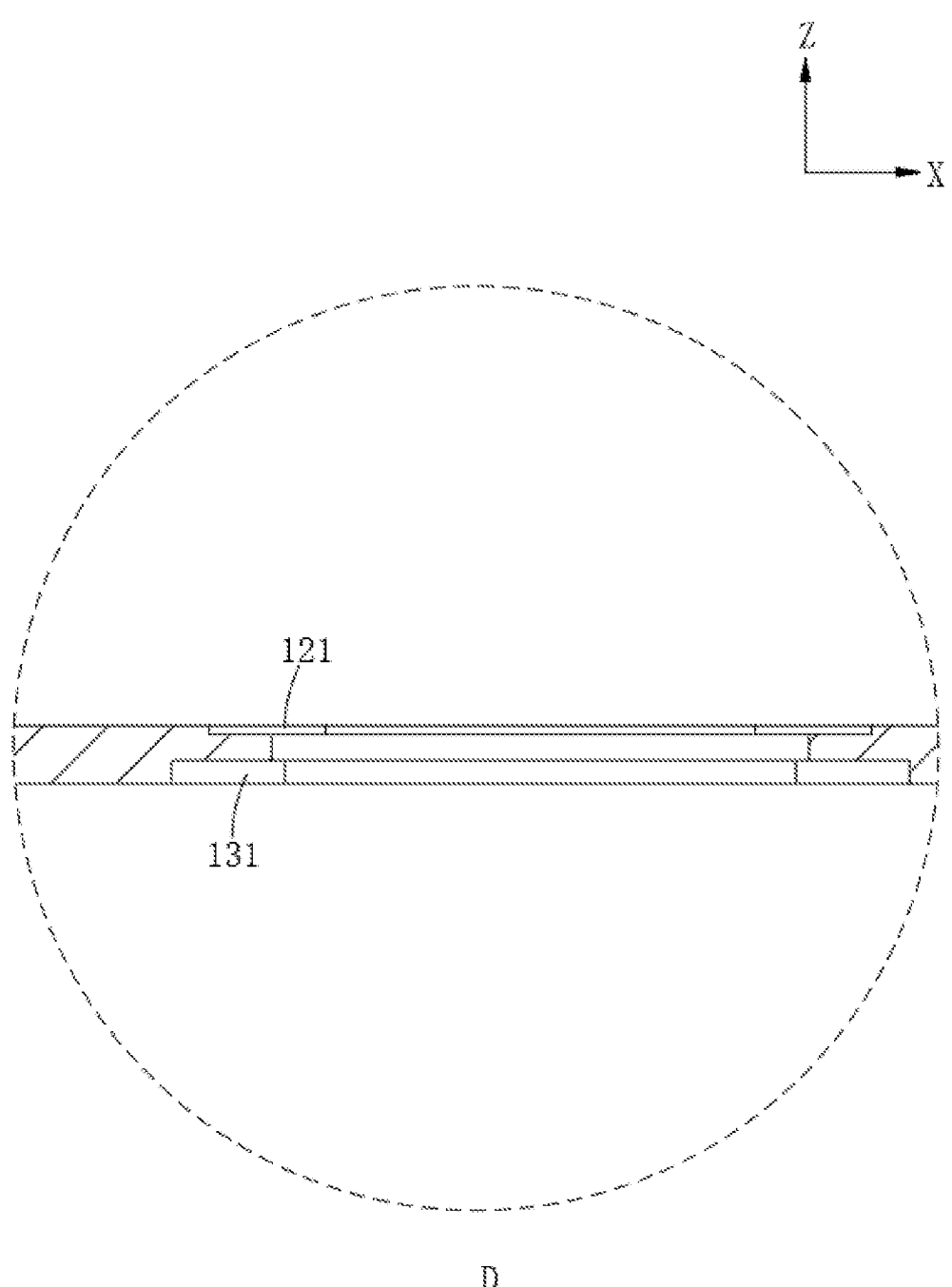
FIG. 14 is a partially enlarged view of the top cover in FIG. 13 at position D.

Further, in some embodiments, referring to FIG. 13 and FIG. 14, the depth of the first recess 121 (i.e., the depth of the first recess 121 in the Z-axis direction in FIG. 14) is less than the depth of the second recess 131 (i.e., the depth of the second recess 131 in the Z-axis direction in FIG. 14).

Since the upper plastic member 3 is smaller and the lower plastic member 4 is larger, by making the depth of the first recess 121 for positioning the upper plastic member 3 smaller than the depth of the second recess 131 for positioning the lower plastic member 4, the first recess 121 with a smaller depth can be used for positioning the smaller upper plastic member 3 and the second recess 131 with a larger depth can be used for positioning the lower plastic member 4, and the depth of the first recess 121 and the depth of the second recess 131 are reasonably designed.

In some embodiments, a volume of the first recess 121 is the same as a volume of the second recess 131. By making the volume of the first recess 121 the same as the volume of the second recess 131, the positioning effect of the first recess 121 on the upper plastic member 3 and the positioning effect of the second recess 131 on the lower plastic member 4 can be substantially the same, so that the whole structural design of the first recess 121 and the second recess 131 is more reasonable.

The volume of the first recess 121 refers to the volume of the cavity enclosed by the first recess 121. For example, when the shape of the first recess 121 is a rectangular recess, the volume of the first recess 121 is the product of the area of the projection of the first recess 121 on the top surface 12 of the top cover 1 and the depth of the first recess 121. Similarly, the volume of the second recess 131 has a similar meaning to the volume of the first recess 121, and details are not repeated here.

In some embodiments, referring to FIG. 10, the number of the mounting holes 11 is two, and two of the mounting holes 11 are located at two ends of the top cover 1 and are symmetrically located with respect to a centerline M of the top cover 1. When the number of the mounting holes 11 is two, the two mounting holes 11 are located at two ends of the top cover 1 and are symmetrically arranged with respect to the centerline M of the top cover 1, so that the layout of the mounting holes 11 on the top cover 1 is more aesthetically pleasing. In addition, it will be appreciated that the number of the terminal posts 2 is usually two (positive terminal post and negative terminal post), and the terminal posts 2 need to be arranged in the mounting holes 11 in a penetrating manner, so that the number of the mounting holes 11 is two, which can provide convenience for the terminal posts 2 to penetrate through the mounting holes 11.

Further, in some embodiments, referring to FIG. 10, the top cover 1 is further provided with a liquid injection hole 14 extending through the top cover 1 in the thickness direction of the top cover 1, with the liquid injection hole 14 located between the two mounting holes 11 and offset from the centerline M of the top cover 1. By providing the liquid injection hole 14 extending through the top cover 1 in the thickness direction of the top cover 1, and when the top cover assembly 4 is applied to the battery 100, the electrolyte can be injected into the housing 200 of the battery 100 through the liquid injection hole 14.

By providing the liquid injection hole 14 between the two mounting holes 11, when the electrolyte is injected into the housing 200 of the battery through the liquid injection hole 14, the electrolyte can reach the middle part of the housing 200 as much as possible, so that the battery performance can be better. In addition, by making the liquid injection hole 14 deviate from the centerline M of the top cover 1, the middle position of the top cover 1 can be left free, so that the area of the top cover 1 occupied by the liquid injection hole 14 can be reduced as much as possible and the positional layout of the liquid injection hole 14 on the top cover 1 is more reasonable.

The shape of the liquid injection hole 14 may be circular, rectangular or any possible shape, and the shape of the liquid injection hole 14 is not limited in the embodiments of the present disclosure.

In some embodiments, referring to FIG. 10, the top cover 1 is further provided with an explosion-proof through hole 15 extending through the top cover 1 in the thickness direction of the top cover 1, and the explosion-proof through hole 15 is located between the two mounting holes 11 and located on the centerline M of the top cover 1. By providing an explosion-proof through hole 15 in the top cover 1, if the top cover assembly 400 is located at the opening of the housing 200 of the battery 100, when the air pressure inside the housing 200 rises rapidly for various reasons and there is a risk of explosion, the pressure can be released through the explosion-proof through hole 15, thus preventing the whole battery from exploding. By making the explosion-proof through hole 15 located on the centerline M of the top cover 1, the explosion-proof through hole 15 can be located in the middle of the top cover 1, thereby achieving a better pressure relief effect.

In this case, the shape of the explosion-proof through hole 15 can be round, racetrack or any possible shape, and is not limited in the embodiments of the present disclosure.

In some embodiments, referring to FIG. 10, the sum of areas of the mounting holes 11, the liquid injection hole 14 and the explosion-proof through hole 15 is S1, and the total area of the top cover 1 is S, $0 < S1/S \leq 0.2$. It has been found by the inventor that, with the sum of areas of the mounting holes 11, the liquid injection hole 14 and the explosion-proof through hole 15 being S1 and the total area of the top cover 1 being S, by making $0 < S1/S \leq 0.2$, on the one hand, S1/S will not be too small, so that the mounting holes 11, liquid injection hole 14 and explosion-proof through hole 15 can each perform their respective functions. On the other hand, S1/S will not be too large, which can ensure that the strength of the top cover 1 is not so weak that causes breakage of the top cover 1.

For example, the value of S1/S may be 0.1, 0.15 or 0.2, etc., as long as $0 < S1/S \leq 0.2$, and the value of S1/S in the embodiments of the present disclosure is not listed one by one.

In some embodiments, referring to FIG. 10 and FIG. 12, an inner edge of the first recess 121 and an inner edge of the second recess 131 are both connected to a hole edge of the mounting hole 11. By making the inner edge of the first recess 121 and the inner edge of the second recess 131 both connected to the hole edge of the mounting hole 11, the machining of the first recess 121 and the second recess 131 can be more convenient.

Figure 15:
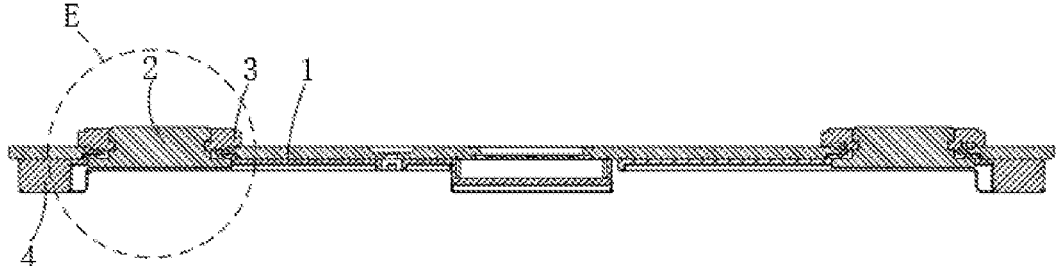
FIG. 15 is a cross-sectional view of the top cover assembly in FIG. 3 at position A-A.
Figure 16:
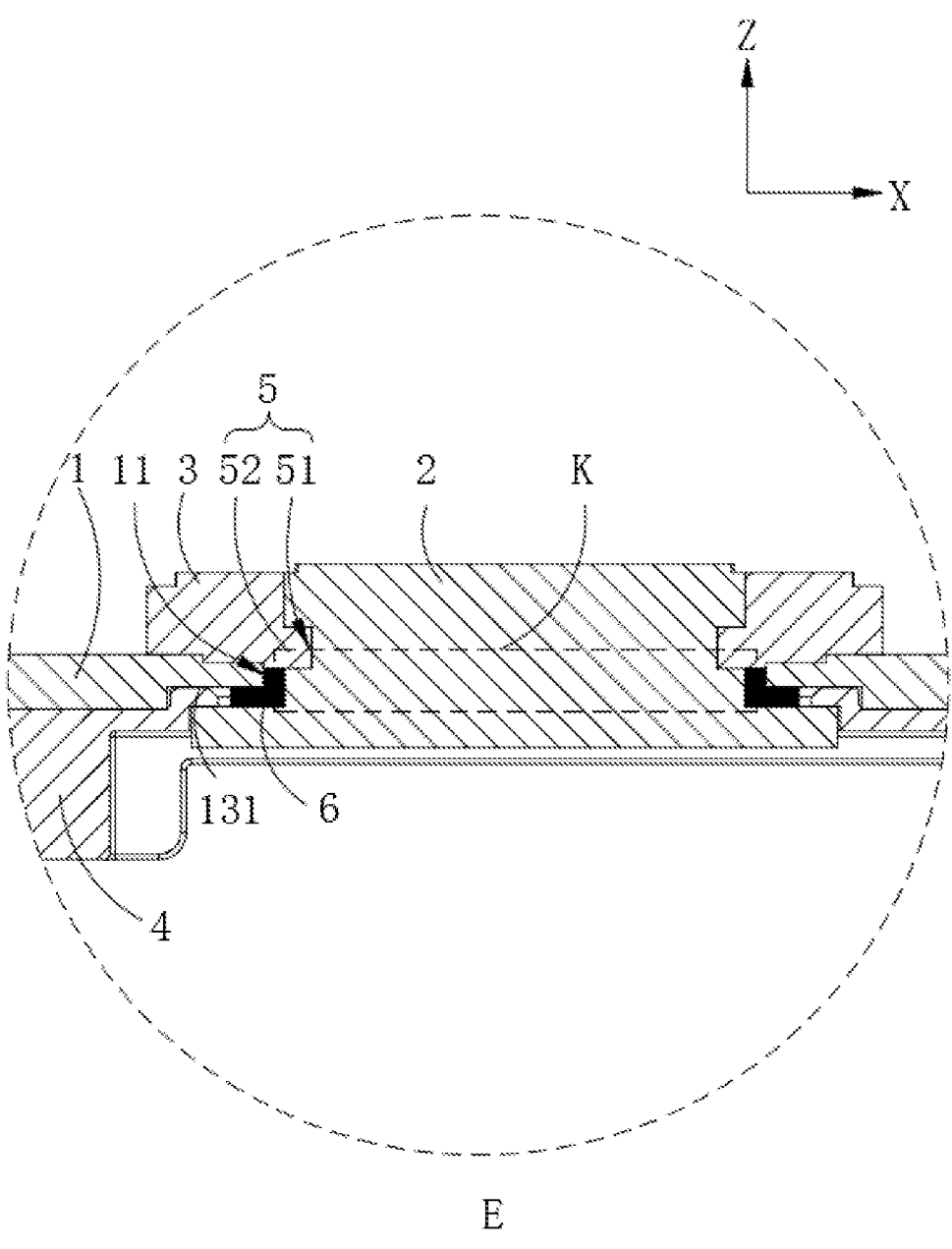
FIG. 16 is a partially enlarged view of the top cover assembly in FIG. 15 at position E.

In some embodiments, referring to FIG. 15 and FIG. 16, the upper plastic member 3 is connected to the second end of the terminal post 2 by a snap-fit structure 5, the snap-fit structure 5 comprising a snap slot 51 and a snap protrusion 52, the snap slot 51 is provided on the second end of the terminal post 2 and the snap protrusion 52 is provided on the upper plastic member 3.

When a snap slot 51 is provided on the second end of the terminal post 2 and a snap protrusion 52 is provided on the upper plastic member 3, the purpose of connecting the upper plastic member 3 to the second end of the terminal post 2 can be achieved by embedding the snap protrusion 52 in the snap slot 51.

Since the connection method of embedding the snap protrusion 52 into the snap slot 51 is very secure, the connection relationship between the upper plastic member 3 and the terminal post 2 can be more secure when the snap-fit structure includes a snap slot 51 and a snap protrusion 52 that cooperate with each other, and the snap protrusion 52 is embedded into the snap slot 51.

In other embodiments, the snap protrusion 52 may also be provided on the second end of the terminal post 2, and the snap slot 51 may be provided on the upper plastic member 3. The arrangement of position of both the snap protrusion 52 and the snap slot 51 are not limited in the embodiments of the present disclosure.

It should be noted that the second end of the terminal post 2 should be understood in a broad sense, i.e., the second end of the terminal post 2 does not only refer to the end opposite to the first end of the terminal post 2, but also includes the structure of the terminal post 2 other than the first end of the terminal post 2.

It should be noted that the upper plastic member 3 can be formed by injection molding, so that in the process of injection molding of the upper plastic member 3, the snap protrusion 52 can be embedded in the snap slot 51, so that the purpose of connecting the upper plastic member 3 to the terminal post 2 can be achieved.

Further, in some embodiments, referring to FIG. 16, the snap-fit structure 5 is at least partially located within the mounting hole 11 (i.e., the position where the dashed box K is located in FIG. 16). By making at least part of the snap-fit structure 5 located in the mounting hole 11, the inner wall surface of the mounting hole 11 can limit the snap-fit structure 5 in the radial direction of the mounting hole 11, and thus can avoid the occurrence of the snap protrusion 52 slipping out of the snap slot 51, and further avoid the occurrence of the upper plastic member 3 falling off from the terminal post 2.

Further, in some embodiments, referring to FIG. 16, the top cover assembly further comprises a sealing member 6, the top cover 1, the upper plastic member 3, the terminal post 2 and the lower plastic member 4 jointly form an accommodating cavity for accommodating the sealing member 6, and the sealing member 6 is disposed in the accommodating cavity. By arranging the sealing member 6 in the accommodating cavity jointly formed by the top cover 1, the upper plastic member 3, the terminal post 2 and the lower plastic member 4, the purpose of closing the accommodating cavity can be achieved. In this way, the top cover assembly 400 can better close the opening of the housing 200 of the battery 100, which can prevent the electrolyte inside the housing 200 from leaking through the accommodating cavity to the outside of the housing 200, thereby improving the performance of the battery 100.

Referring to FIG. 16, a portion of the sealing member 6 is embedded between an inner wall surface of the mounting hole 11 and an outer wall surface of the terminal post 2. In this way, the sealing member 6 can closes the gap between the inner wall surface of the mounting hole 11 and the outer wall surface of the terminal post 2, so that the leakage of the electrolyte to the outside of the housing 200 through the gap between the inner wall surface of the mounting hole 11 and the outer wall surface of the terminal post 2 can be avoided.

Further, in some embodiments, referring to FIG. 16, another portion of the sealing member 6 is embedded between the second recess 131 and the first end of the terminal post 2. By embedding another portion of the sealing member 6 between the second recess 131 and the first end of the terminal post 2, the sealing member 6 can close the gap between the second recess 131 and the first end of the terminal post 2, thus avoiding electrolyte leakage to the outside of the housing 200 through the gap between the second recess 131 and the first end of the terminal post 2.

It should be noted that, referring to FIG. 16, by making a portion of the sealing member 6 embedded between the inner wall surface of the mounting hole 11 and the outer wall surface of the terminal post 2, and another portion embedded between the second recess 131 and the first end of the terminal post 2, the sealing member 6 can be limited in both the radial direction (i.e., the direction parallel to the X-axis in FIG. 16) and the axial direction (i.e., the direction of the Z-axis in FIG. 16) of the terminal post 2, so that the sealing member 6 can be more stably fixed in the accommodating cavity, thus allowing a better sealing effect of the sealing member 6.

It should be noted that the sealing member 6 can be made of flexible material, and when the sealing member 6 is made of flexible material, the sealing member 6 can be made slightly larger. During installation, the sealing member 6 can be deformed according to the shape of the gap between the inner wall surface of the mounting hole 11 and the outer wall surface of the terminal post 2 and the shape of the gap between the second recess 131 and the first end of the terminal post 2 to fit the shape of the above two gaps. In turn, a portion of the sealing member 6 is tightly sandwiched between the inner wall surface of the mounting hole 11 and the outer wall surface of the terminal post 2, and another portion is tightly sandwiched between the second recess 131 and the first end of the terminal post 2, so that the sealing performance of the sealing member 6 is better.

Embodiment 2

FIG. 1 is a schematic structural view of a battery according to an embodiment of the present disclosure. Referring to FIG. 1, the battery includes a top cover assembly 400.

The structure of the top cover assembly 400 may be the same as that of any one of the top cover assembly 400 in the above-mentioned embodiments, and can bring the same or similar beneficial effects with specific reference to the description of the top cover assembly 400 in the above-mentioned embodiments, and details are not described herein again in the embodiments of the present disclosure.

In the embodiments of the present disclosure, since the upper plastic member 3 in the top cover assembly 400 does not move relative to the top cover 1 in the direction parallel to the top surface 12 of the top cover 1, the connection relationship between the upper plastic member 3 and the top cover 1 may be more secure. Based on this, when the top cover assembly 400 is applied in the battery, the battery may be more durable.

The top cover assembly of battery and the battery disclosed in the embodiments of the present disclosure are described in detail above. Specific examples are used herein to describe the principles and implementations of the present disclosure, and the descriptions of the above embodiments are merely used to help understand the top cover assembly of battery and the battery of the present disclosure and the core idea thereof. Meanwhile, for a person of ordinary skill in the art, according to the idea of the present disclosure, there is a change in the specific implementation and application range. In summary, the content of the present specification should not be construed as a limitation of the present disclosure.

What is claimed is:

1. A top cover assembly for a battery, the battery comprising a housing having an opening and a jelly-roll disposed within the housing, the top cover assembly being for closing the opening, wherein the top cover assembly comprises:

a top cover, the top cover having at least one mounting hole, the mounting hole extending through the top cover in a thickness direction of the top cover, the top cover having a first recess on a top surface thereof, the first recess being provided around the mounting hole;

a terminal post, the terminal post penetrating the mounting hole, a first end of the terminal post being limited to a side of the top cover on which a bottom surface thereof is located, a second end of the terminal post being higher than the top surface of the top cover; and an upper plastic member, the upper plastic member being provided on a side of the top cover on which the top surface is located and surrounding the second end of the terminal post to be connected to the second end of the terminal post, the upper plastic member having a first boss on a bottom surface thereof, the first boss being accommodated in the first recess, the bottom surface of the upper plastic member being located on the top surface of the top cover, wherein:

a first convex ring is provided at an outer edge of the first recess, and the first convex ring is provided around the mounting hole, a first concave ring is provided at a position of the first boss of the upper plastic member corresponding to the first convex ring, and the first convex ring is embedded in the first concave ring.

2. The top cover assembly according to claim 1, wherein: the top cover assembly further comprises a lower plastic member, the lower plastic member being provided on a side of the top cover on which the bottom surface thereof is located; and the top cover is provided with a second recess on the bottom surface thereof, the second recess is provided around the mounting hole, a second boss matching the second recess is provided at a position of the lower plastic member corresponding to the second recess, and the second boss is accommodated in the second recess.

3. The top cover assembly according to claim 1, wherein the first convex ring is provided along an edge of the first recess, and the first convex ring protrudes from the top surface of the top cover.

4. The top cover assembly according to claim 2, wherein: the first recess has a rectangular shape; and/or the second recess has a rectangular shape.

5. The top cover assembly according to claim 2, wherein an area of a projection of the first recess on the top surface of the top cover is smaller than an area of a projection of the second recess on the top surface of the top cover.

6. The top cover assembly according to claim 2, wherein a depth of the first recess is less than a depth of the second recess.

7. The top cover assembly according to claim 2, wherein a volume of the first recess is the same as a volume of the second recess, and the volume of the first recess is a volume of a cavity enclosed by the first recess; and a volume of the second recess is a volume of a cavity enclosed by the second recess.

8. The top cover assembly according to claim 1, wherein: the top cover has two mounting holes, and the two mounting holes are located at two ends of the top cover and are symmetrically located with respect to a centerline of the top cover.

9. The top cover assembly according to claim 8, wherein: the top cover is further provided with a liquid injection hole extending through the top cover in the thickness direction of the top cover, and the liquid injection hole is located between the two mounting holes and is offset from the centerline of the top cover.

10. The top cover assembly according to claim 9, wherein: the top cover is further provided with an explosion-proof through hole extending through the top cover in the thickness direction of the top cover, and the explosion-proof through hole is located between the two mounting holes and located on the centerline of the top cover.

11. The top cover assembly according to claim 10, wherein a sum of areas of the mounting hole, the liquid injection hole and the explosion-proof through hole is S1, and a total area of the top cover is S, $0 < S1/S \leq 0.2$.

12. The top cover assembly according to claim 2, wherein an inner edge of the first recess and an inner edge of the second recess are both connected to a hole edge of the mounting hole.

13. The top cover assembly according to claim 1, wherein the upper plastic member is connected to the second end of the terminal post by a snap-fit structure, the snap-fit structure comprising a snap slot and a snap protrusion that cooperate with each other, the snap slot being provided on one of the upper plastic member and the second end of the terminal post, and the snap protrusion being provided on the other of the second end of the terminal post and the upper plastic member.

14. The top cover assembly according to claim 13, wherein the snap-fit structure is located at least partially within the mounting hole.

15. The top cover assembly according to claim 2, wherein: the top cover assembly further comprises a sealing member, the top cover, the upper plastic member, the terminal post and the lower plastic member jointly form an accommodating cavity for accommodating the sealing member, and the sealing member is disposed in the accommodating cavity.

16. The top cover assembly according to claim 15, wherein a portion of the sealing member is embedded between an inner surface of the mounting hole and an outer surface of the terminal post.

17. The top cover assembly according to claim 16, wherein another portion of the sealing member is embedded between the second recess and the first end of the terminal post.

18. A battery comprising the top cover assembly according to claim 1.

* * * * *